Inventor
Robert H. Hammond
Anderson, Luedeka, Fitch, Even, & Tabin
Attorneys

3,556,837
COMPOSITE AND METHOD OF MAKING SAME

Robert H. Hammond, Berkeley, Calif., assignor to Gulf Energy & Environmental System, Inc., a corporation of Delaware
Continuation-in-part of application Ser. No. 535,284, Jan. 28, 1966. This application Nov. 22, 1967, Ser. No. 685,180
Int. Cl. B44d 1/14
U.S. Cl. 117—71                                  9 Claims

ABSTRACT OF THE DISCLOSURE

High strength composite made of a plurality of pairs of alternating layers each of which is made by vapor deposition. The material of one group of layers is ductile, relative to the other. The composite may have a very high tensile strength or modulus of elasticity by so choosing the other material. The layers are usually between about 100 A. and 10 microns thick and may have a very thin layer of a third material deposited therebetween to improve bonding.

---

This application is a continuation-in-part of my patent application Ser. No. 535,284, filed Jan. 28, 1966, now Pat. No. 3,449,092.

This invention relates to composites and more particularly to composites having high strength for structural applications.

Structural materials in which a high strength, usually brittle material is combined with a ductile but relatively weak material have become known by the name "composites." Such composites usually have high strength and adequate flexibility to serve as structural materials. If desired, the materials may be chosen so the modulus of elasticity is high and the composite is relatively stiff. For many applications, for example in the manufacture of parts for airframes, low density is a desirable quality in a composite.

In the past, high strength, relatively low-density composites have been made using fibrous materials, such as felts or strands, of glass, quartz, or boron fibers, as the high-strength material. The use of such fibers of very small diameter takes advantage of the relatively high tensile strength and low density of these materials, while reducing the adverse effects of their brittleness and inflexibility.

The present invention is basically concerned with the deposition of alternating layers of a high-strength, brittle material and a lower strength, ductile material. Since the same materials qualify for the two components as in conventional composites, we shall refer to the high-strength layers as "fiber" or "fibrous" layers, and to the ductile, lower strength layers as "matrix" layers.

The material for the matrix layers should have adequate chemical compatibility with the fibrous material, both during fabrication of the composite and under conditions of expected use. Organic resins having good strength, such as epoxy resins, have in the past been used as the material for the matrix layers.

Figure 2:
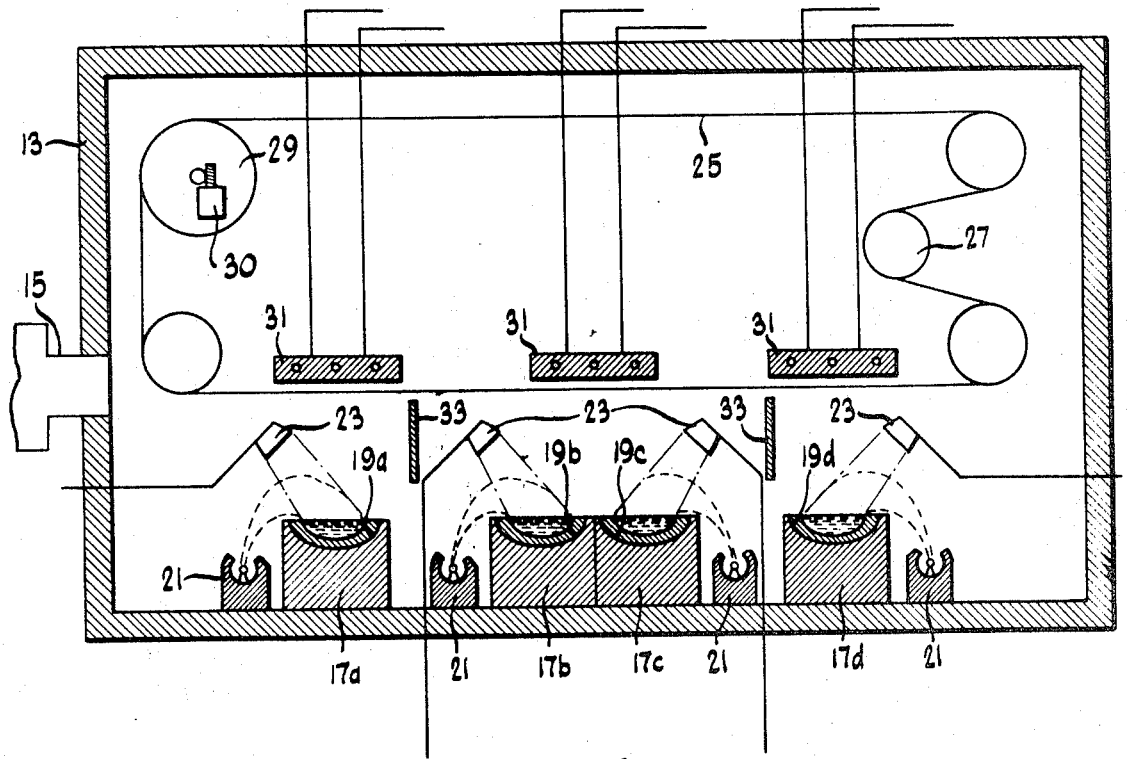
Figure 1:
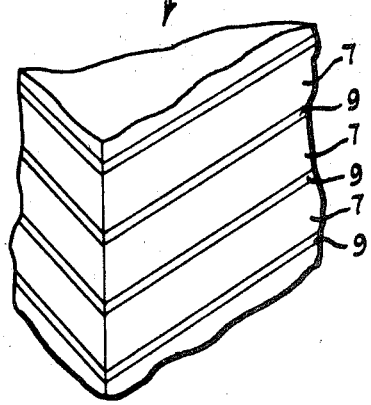

It is an object of the present invention to provide composites having improved properties and to provide methods of making same. It is a more specific object of the present invention to provide composites having improved tensile strength. A further object is to provide improved high modulus of elasticity, or stiffness, and stiffness-to-density ratio. It is another object of the invention to provide a composite having good strength and relatively low density. Still another object is to provide composites having good resistance to high temperatures. It is a further object to provide improved methods for making composites which facilitate the production thereof and improve the properties of the resultant products. Still another object is to provide a method for making composite materials having improved strength and resistance to a high temperature environment. These and other objects of the invention are apparent from the following detailed description when read in conjunction with the accompanying drawings wherein:

FIG. 1 is an enlarged fragmentary perspective view of a composite embodying various features of the invention; and FIG. 2 is a diagrammatic illustration of apparatus with which methods of making the composite shown in FIG. 1 may be practiced.

An improved composite 5, as illustrated in FIG. 1, is provided which is made of a plurality of alternating thin layers, layers 7 of high strength "fibrous" material and layers 9 of ductile matrix material, both of which groups of layers are condensates from vapor. It has been found that by depositing both of these groups of layers from a vaporous atmosphere, condensates are produced which are not only of uniform character throughout but also, because of the method of their formation, are provided naturally with excellent adherence or bonding between adjacent layers. Moreover, if the nature of the particular materials chosen to make a composite is such that adjacent layers do not inherently exhibit good adherence to each other, the conditions of manufacture are adjusted to produce alloying or interdispersion at the interfacial region between adjacent layers to establish effective adherence. Alternatively, a very thin "mating" layer of a third material which exhibits good adherence to both the matrix material and the fibrous material may be employed at each interface, the third material also being a condensate from a vaporous atmosphere. In general, the adherence between adjacent layers should desirably be approximately equal to the shear strength of the ductile matrix layer.

In addition to providing good adherence between layers, manufacture of the composite 5 in this manner facilitates the use of a large number of very thin layers in a composite of given overall thickness which provides high statistical redundancy in the structure. With such very thin layers, furthermore, surface locking of dislocations at the surfaces substantially reduces the effect of any dislocations in layers and accordingly results in high strength. Moreover, through condensation it is possible to obtain layers that are essentially single crystal, with few defects, with the dimensions of the crystal in the plane of the layer sufficiently large so the matrix layer transmits force between crystallites in neighboring layers.

In general, a composite 5 will be made for a certain structural application, and the fibrous material 7 is chosen to suit this end use. For example, if a strong, stiff composite is desired, an appropriate fibrous material is chosen, and the composite is manufactured so that thickness of the fibrous layer 7 relative to the thickness of the matrix layer 9, will be large and thus the volume fraction of the fibrous material in the composite will be quite high. Examples of fibrous materials suitable for the manufacture of composites include the elements boron, carbon, silicon, beryllium and the refractory metals. For purposes of this application the term "refractory metals" should be understood to include Ti, Zr, Hf, V, Nb, Ta, Cr, Mo, W, Th, and U. Suitable fibrous materials also include chemically stable compounds, such as ceramics, for example: $B_4C$, BN, SiC, $SiO_2$, $Al_2O_3$, BeO, $Si_3N_4$, and the refractory metal carbides, nitrides, borides, silicides and various mixtures thereof.

In general, the fibrous layer 7 is made of a suitable material which is chemically stable and which can be condensed from a vaporous atmosphere. An alloy or intermetallic substance, such as $Nb_3Sn$, may be used as the fibrous layers. In that case, the fibrous layer can be produced by condensation from a combination of several vapors.

As indicated above, desirable properties of the composite result from the deposition of the layers by condensation from a vaporous atmosphere. The vapor may be provided by evaporation or by sublimation with heat in a vacuum chamber or in a partially closed chamber at atmospheric pressure. The vapor may also be provided by sputtering or by pyrolysis. In general, the employment of means for evaporating the material or components which provide the material to be deposited within a vacuum chamber facilitates economical production and is preferred. The energy for the formation of the vapor can be provided by any suitable means, such as electrical resistance heating, induction heating, electron bombardment, arcs, concentrated radiation as in a solar furnace, or in the case of sputtering, energy transfer from accelerated ions. In the apparatus illustrated in FIG. 2, electron bombardment heating is employed.

The determining feature for the selection of the fibrous material is made primarily on the basis of the physical properties desired for the end use of the composite. In an application where the composite will be usually under tension, a fibrous material is chosen which has good tensile strength. For such applications, the fibrous material should have a tensile strength equal to at least about 200K p.s.i. (thousands of pounds per square inch). For other applications, the flexibility or the stiffness of the material might be considered the most important feature. Of course, if the anticipated end use is to be subject to a high temperature environment, a fibrous material is chosen which also has physical properties meeting these requirements.

In general, the composites provided by this invention are considered superior to prior art composites for several reasons. The strength of the fibrous layers which are condensates from a vaporous atmosphere is the same in all directions lying in the layer plane whereas the strength of composites made using actual fibers is uniaxial. The overall strength is greater because of the excellent bonding between adjacent layers achieved at the interfaces. The resistance to high temperature can be high because of the absence of any nonmetallic matrix material or bond. By suitable selection of materials, the composite may be provided a high thermal and/or electrical conductivity.

As previously indicated, the matrix material is generally chosen for its ductility and relatively good shear strength, plus its chemical compatibility with the particular fibrous material to be employed in the composite.

Moreover, the matrix material is chosen to have properties which complement the particular fibrous material chosen for the composite. Thus, depending upon the particular properties desired for the composite, the matrix is chosen to have an appreciably higher ductility or an appreciably lower modulus of elasticity than the fibrous material. In general, the ductility of the matrix material will be such that it can withstand an elongation of one percent or more without rupture. Accordingly, if a fairly ductile fibrous material is chosen for a particular application the matrix material should have a ductility at least about 2 or 3 times as great. Similarly, if a fibrous material is chosen to have a fairly high modulus of elasticity, the matrix material is likewise chosen to have a modulus at least about 2 or 3 times smaller.

In general, the elements such as aluminum, beryllium, magnesium, scandium, iron, nickel, copper, yttrium, silver, tin, zirconium, titanium and other suitable ductile metals may be used. In addition, suitable alloys such as stainless steel may be used. Because the ductility of a substance is often influenced by impurities, the purity of the substance may be important for the matrix material. For example, beryllium, zirconium and titanium of sufficient purity are adequately ductile.

It is noted that some of the materials previously listed as examples of suitable fibrous materials also appear on the list of examples of suitable matrix materials. It should be understood however that the same material would not be used as both the fibrous material and the matrix material in one composite. For example, beryllium might be used as a fibrous material with a nickel or aluminum matrix, whereas it might also be used as a matrix material with a brittle fibrous material such as silicon carbide. Similarly, titanium might be used as a fibrous material with a very ductile matrix material, such as aluminum or iron.

Ductility is also a property which is often contingent upon temperature so that, if the end use of the composite is one which may mean exposure to a low temperature environment, a matrix material is selected which retains its ductility at such low temperatures. Because, as indicated hereinbefore, the desired ductility of the matrix material is dependent upon the particular application proposed for the composite and upon the particular fibrous material with which it is employed, it cannot be simply defined in absolute terms. It is because the ductility desired is relative to the properties of the fibrous layer, that a substance, for example titanium or niobium, which may be a suitable fibrous material for one composite where ductility is of substantial importance, may also be a suitable matrix layer for use with a more brittle fibrous material, as indicated above.

The desired properties of the composite for each particular use generally determine the actual configuration of the composite to be employed. For instance, one may obtain the same overall physical properties using a certain number of pairs of layers using two particular materials of one set of thicknesses as one would obtain with a larger number of layers of lesser thicknesses using two different materials. From a practical standpoint the thickness of each fibrous layer will usually be the same within a composite, as will the thickness of each matrix layer. The desired resultant properties of the composite in general determine the maximum and minimum thicknesses of the individual layers to be used. From the standpoint of manufacturing, the rate of production may often be increased if thicker layers are used so that a smaller number of pairs of layers will be needed to make a composite of certain thickness. On the other hand, using some materials, the production time may not be a substantial point of variance, and a larger number of pairs of layers may be employed without a substantial difference in cost, in order to achieve greater redundancy, flexibility or strength.

In general, the physical properties of the particular substance chosen for each of the layers most significantly influences the layer thickness that is used. For example, if the elasticity modulus of the fibrous material is high, a relatively thin layer of it may be employed in the composite to make it more flexible. Because in the composite, as presently contemplated, the fibrous layer is the more important from the standpoint of providing the desired overall strength, the fibrous layer in a composite designed to have high tensile strength or to have a high elasticity modulus will normally be substantially thicker than the matrix layer. Very generally, it is contemplated that the layers will vary between about 100 A. and a few microns in thickness, with the fibrous layer sometimes being as much as 5–10 times as thick as the matrix layer. For a composite that is designed for use as a part of a multiply layup or lamination to produce a structural product, the total thickness of the composite will be measured in the hundreds of microns.

A preferred method of preparing the improved composite 5 involves selective vacuum deposition in an electron beam furnace and is described in detail below and illustrated in FIG. 2. Utilizing such a technique, the composite 5 is formed on a substrate made of any suitable material, such as stainless steel, Hastelloy-B, tantalum, titanium or copper. Because the composite is separated from the substrate after the desired number of layers have been deposited, the properties of the substrate are in no way critical.

The process for producing the improved composite 5, illustrated in FIG. 2 of the drawings, utilizes an electron beam furnace 11 which is suitable for the production of the improved composite 5. The electron beam furnace 11 includes an outer enclosure 13 which is adapted to permit evacuation therewithin to very low pressures via a large conduit 15 which leads to a suitable vacuum pump (not shown). A series of hearths, 17a, 17b, 17c and 17d are supported within the enclosure 13 each of which are provided with suitable cooling systems (not shown). The upper portions of the hearths are fashioned to serve as crucibles 19a, 19b, 19c and 19d. In the illustrated arrangement, the central two crucibles 19b and 19c are used to hold two elements the vapors of which can be condensed to form the fibrous material, and the crucibles 19a and 19d on each side thereof are used to hold material from the vapor of which the matrix layers are deposited. The use of both 19a and 19d may not be needed. If a "mating" layer is desired between matrix and fiber, another crucible may be employed and the following sequence created: mating layer, fiber layer, mating layer, matrix layer.

An electron gun 21 is provided in association with each of the crucibles to provide sufficient electron bombardment to heat the substance in each crucible to the desired temperature for evaporation. Electron guns 21 of any suitable construction may be employed. The illustrated electron guns are of the general type disclosed in U.S. Pat. No. 3,132,198. The rate of evaporation from each crucible is controlled by monitoring means 23 mounted generally vertically above the crucibles 19. Suitable control systems are used, such as are known in the prior art for use with vacuum evaporation apparatus of this type. The control systems regulate the evaporation utilizing feedback from the monitors 23 to proportionately increase or decrease the power being supplied to the associated electron guns 21 in order to obtain evaporation of the substance in the associated crucible 19 at precisely the desired rate.

One or more substrate bands 25 are disposed in the enclosure 13 at a location above the plurality of crucibles 19. In FIG. 2, one band 25 is illustrated which is a continuous loop that is trained about several rollers, including an idler roller 27 and a drive roller 29. The drive roller 29 is powered through a worm gear arrangement by a drive motor 30. The continuous loop facilitates the manufacture of a composite 5 containing a large number of pairs of layers of different materials. The illustrated arrangement within the furnace 11 is designed to assure that good adherence is achieved between adjacent layers. In this respect, the evaporation is controlled to deposit about one-half of the total thickness of each matrix layer from each of the two crucibles 19a and 19d, which flank the central crucibles 19b and 19c wherefrom the fibrous layer is deposited. Thus, there is an immediate transition from the deposition of one layer to the deposition of the other. However, it should be understood that one of the crucibles 19a or 19b could be omitted, if desired.

Separate heaters 31 are disposed above the substrate 25 at each evaporation region so as to heat the substrate to the desired deposition temperature for each layer. Moreover, in addition to regulating the temperature to desirably affect properties of the layer being condensed, such heating may also be employed so as to cause some diffusion of the layer being condensed into the adjacent layer upon which it is being deposited to thereby increase the adherence of the bond therebetween.

If the matrix material and the fibrous material do not wet one another or if alloying or interdiffusion do not occur therebetween, the illustrated apparatus can be modified slightly to cause a mixing of the vapor from the region of evaporation above the central crucibles 19b and 19c from which the components for the fibrous layer are evaporated and the vapors from the two flanking evaporation regions of the matrix material. Usually baffles or shields 33 are located between the respective regions to mask them apart. By relocating or removing the shields 33, mixing of the vapors in the desired amount is achieved, causing an overlap between the regions of evaporation which produces a gradual transition of material composition from the fibrous layer to the matrix layer and vice versa.

As previously mentioned, in some instances, to achieve the desired adherence between the surfaces of adjacent layers, it may be desirable to condense a thin layer of a substance which wets both the fibrous layer and the matrix layer at each interface therebetween. Usually no more of the substance will be used than necessary for the bonding. For example, 10–20 A. of niobium might be used between fibrous layers of $Nb_3Sn$ and matrix layers of copper.

The following examples illustrate the best modes presently known by the inventor for carrying out his invention. However, it should be understood that these examples are merely illustrative embodiments of the invention and are not to be considered to limit the scope of the invention which is defined only by the claims appearing at the end of the specification.

EXAMPLE I

A composite 5 is made of alternating layers of copper as the matrix layer 9 and the intermetallic substance $niobium_3$ tin as the fibrous layer 7 using the apparatus illustrated in FIG. 2. A continuous loop of Hastelloy-B 0.1 inch wide is used as the substrate and is driven continuously at a speed of about one inch per second. The enclosure 13 is evacuated to a pressure of about $10^{-5}$ torr.

The rate of power supplied to the electron guns is controlled so as to evaporate the niobium metal in the crucible 19b at a rate of about 3.300 A. per sec. The metallic tin in the crucible 19c is evaporated at a rate about one-half that of the niobium. The rate of evaporation of copper from each of the crucibles 19a and 19d is regulated to a value of about one-fourth that of the niobium. The substrate heaters 31 are adjusted so as to heat the substrate at the locations above the two regions of the evaporation of the copper to a temperature of about 100° C. and to heat the substrate at the region of evaporation and condensation of the $Nb_3Sn$ to a temperature of about 750° C. Operation at these values deposits upon the continuous moving substrate 25 alternating layers of copper about ½ micron thick and of $Nb_3Sn$ about 1 micron thick.

After about twenty-five pairs of alternating layers of copper and $Nb_3Sn$ are deposited on the substrate, the power is removed from the electron guns halting the evaporation and any further condensation. The deposited composite is stripped fromt he Hastelloy-B substrate, examined and tested. The composite measures about 37 microns thick. The volume fraction of fibrous layer, $Nb_3Sn$, is about 67%. Testing by the standard tensile test method shows that the tensile strength of the composite is abou 100,000 p.s.i., and the modulus of elasticity of the composite is about $30 \times 10^6$/p.s.i. The density of the composite measures about 8.9 grams per cc. Thus, the tensile strength-to-density ratio is about $0.3 \times 10^6$ inch, and the modulus of elasticity-to-density ratio is about $100 \times 10^6$ inch.

EXAMPLE II

The process of Example I is repeated, substituting niobium for the copper as the matrix material. The substrate is driven at the same speed as in Example I and the rates of evaporation from the crucibles 19b and 19c are maintained the same. The total rate of evaporation of niobium from the crucibles 19a and 19d is maintained at about one-half that of the niobium from the crucible 19b. Operation in this manner produces a composite material made up of alternating layers of $Nb_3Sn$ about one micron thick and niobium about one-half micron thick.

After about fifteen pairs of alternating layers are deposited, the evaporation process is halted and the composite is stripped from the substrate.

The composite measures about 23 microns thick and has a density of about 8.8 grams per cubic centimeter. The composite is about 67 volume percent $Nb_3Sn$. The tensile strength and modulus of elasticity are measured as in Example I. The tensile strength is about 100,000 p.s.i., and the modulus of elasticity is about $30 \times 10^6$/p.s.i. The ratio of tensile strength to density is $0.3 \times 10^6$ inch, and the modulus of elasticity-to-density ratio is about $100 \times 10^6$ inch. The composite material is considered to be well suited for use in applications combining superconducting properties and structural properties.

EXAMPLE III

The process of Example I is repeated, substituting aluminum for the copper in crucibles 19a and 19d and substituting boron for the material in crucible 19b. Crucible 19c is not used. Driving the same substrate at the same speed and using the same vacuum conditions as in Example I, boron is evaporated at a rate of about 3300 A. per second to form the fibrous layer. The total rate of evaporation from aluminum from the flanking crucibles 19a and 19d is regulated at about one-quarter that of the boron. Operation under these conditions produces as a composite made up of alternating layers of boron of about one micron thick and aluminum about one-quarter micron thick.

After about fifteen pairs of these alternating layers are deposited, the evaporation process is halted and the composite is stripped from the substrate. The composite measures about 20 microns thick and has a density of about 2.5 grams per cubic centimeter. The composite is about 80 volume percent boron. Testing is carried out as in Example I, and the tensile strength measures about $10^5$ p.s.i. and the modulus of the elasticity about $30 \times 10^6$ p.s.i. Thus the composite has a tensile strength-to-density ratio of about $1.1 \times 10^6$ inch and a modulus of elasticity-to-density ratio of about $330 \times 10^6$ inch. The composite is considered to be excellently suited for use as a structural material in applications such as the manufacture of an airframe.

It is believed that the process provided by the invention is adaptable to the economical production of composites having a large number of alternating pairs of very thin layers of matrix and fibrous material. Using very thin layers, a greater number of layers of alternating material are provided in a composite of given thickness, and the consequent greater redundancy is such to effectively lessen any effect of defects which might occur in an individual layer. A high volume fraction of fibrous material can be realized in the composite, and consequently relatively high-density matrix materials, such as nickel, which can be joined by conventional methods, may be utilized without unduly increasing the overall density of the composite. Moreover, because materials can be chosen that are stable at very high temperatures. The resultant composite will retain both high stiffness and high tensile strength even at exposure to a high temperature environment. The choice of individual substances which can be evaporated is extremely large, and it is contemplated that certain compounds may be evaporated in compound form as well as being condensed from an atmosphere formed by simultaneous evaporation from the individual elements.

Various features of the invention are set forth in the following claims.

I claim:

1. A method of making a high strength composite, which method comprises depositing a layer of a first material upon a substrate by condensation from a vapor atmosphere, depositing a layer of a second material upon said layer of first material by condensation from a vapor atmosphere of different composition, and repeating said deposition steps at least five times to provide at least five superimposed pairs of said layers arranged in alternating relationship, said layers of one material being of a thickness greater than said layers of the other material and having a high tensile strength, said one material being selected from the group consisting of B, C, Si, Be, $B_4C$, BN, SiC, $SiO_2$, $Al_2O_3$, BeO, $Si_3N_4$, $Nb_3Sn$, the refractory metals, and the carbides, borides, nitrides and silicides of the refractory metals, and said layers of the other material having good ductility, said other material being selected from the group consisting of Al, Be, Mg, Sc, Fe, Ni, Cu, Y, Fr, Ag, Sn, Zr, Ti and mixtures and alloys thereof, said deposition conditions being controlled to establish a good bond between each layer and the layer thereadjacent.

2. The invention in accordance with claim 1 wherein the substrate is heated to cause alloying of said layers at the interfaces therebetween.

3. The invention in accordance with claim 1 wherein said substrate is moved past regions of condensation of said first and second material layers and there is mixing of the vapors adjacent regions of condensation to provide some interdispersion of materials at the interfaces between adjacent layers.

4. The invention in accordance with claim 1 wherein a layer of a third material having a thickness less than the layers of either of said first and second materials is deposited by condensation from a vapor atmosphere between each layer of said first and second material, the composition of said third material being such as to bond very well to both said first material and to said second material.

5. The invention in accordance with claim 1 wherein said layers are between 100 A. and about 10 microns thick.

6. The invention in accordance with claim 5 wherein said ductile layer has a ductility at least about 2-3 times that of said high tensile strength layer.

7. The invention in accordance with claim 5 wherein said ductile layer has a modulus of elasticity at least about 2-3 times smaller than that of said high tensile strength layer.

8. A method of making a high strength composite having a tensile strength of at least about 100,000 p.s.i., which method comprises depositing a layer of boron upon a substrate by condensation from a vapor atmosphere, depositing a layer of aluminum upon said boron layer by condensation from a vapor atmosphere, repeating said deposition steps at least about fifteen times to provide at least about fifteen pairs of said layers arranged in alternating relationship, said layers of boron being of a thickness greater than said layers of aluminum, and removing said composite from said substrate.

9. The invention in accordance with claim 8 wherein said relative thicknesses of said layers is such that said composite is about eighty volume percent boron.

References Cited

UNITED STATES PATENTS

| | | | |
|---|---|---|---|
| 3,046,936 | 7/1962 | Simons, Jr. | 117—107.1X |
| 3,205,461 | 9/1965 | Anderson | 117—217X |
| 3,278,331 | 10/1966 | Taylor et al. | 117—107.1 |
| 3,350,180 | 10/1967 | Croll | 117—217X |
| 3,395,000 | 7/1968 | Hanak et al. | 117—217X |

ALFRED L. LEAVITT, Primary Examiner

C. K. WEIFFENBACH, Assistant Examiner

U.S. Cl. X.R.

29—195, 197; 117—106, 107